(12) United States Patent
Wilson et al.

(10) Patent No.: US 9,696,427 B2
(45) Date of Patent: Jul. 4, 2017

(54) WIDE ANGLE DEPTH DETECTION

(75) Inventors: Andrew Wilson, Seattle, WA (US); Hrvoje Benko, Seattle, WA (US); Jay Kapur, Redmond, WA (US); Stephen Edward Hodges, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1018 days.

(21) Appl. No.: 13/585,606

(22) Filed: Aug. 14, 2012

(65) Prior Publication Data

US 2014/0049609 A1 Feb. 20, 2014

(51) Int. Cl.
*G01S 17/89* (2006.01)
*H04N 13/02* (2006.01)
*G01B 11/25* (2006.01)

(52) U.S. Cl.
CPC .......... *G01S 17/89* (2013.01); *G01B 11/2513* (2013.01); *H04N 13/0253* (2013.01); *H04N 13/0271* (2013.01)

(58) Field of Classification Search
CPC ........... H04N 13/0239; H04N 13/0055; H04N 13/0296; H04N 13/0497; H04N 13/0242
USPC ........................................................ 348/46
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — William C Vaughn, Jr.
*Assistant Examiner* — Daniel Tekle
(74) *Attorney, Agent, or Firm* — Alleman Hall Creasman & Tuttle LLP

(57) ABSTRACT

Embodiments for a depth sensing camera with a wide field of view are disclosed. In one example, a depth sensing camera comprises an illumination light projection subsystem, an image detection subsystem configured to acquire image data having a wide angle field of view, a logic subsystem configured to execute instructions, and a data-holding subsystem comprising stored instructions executable by the logic subsystem to control projection of illumination light and to determine depth values from image data acquired via the image sensor. The image detection subsystem comprises an image sensor and one or more lenses.

20 Claims, 8 Drawing Sheets

(56) References Cited

U.S. PATENT DOCUMENTS

| | | |
|---|---|---|
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |

(56) References Cited

U.S. PATENT DOCUMENTS

| | | | |
|---|---|---|---|
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2004/0196282 | A1 | 10/2004 | Oh |
| 2007/0285419 | A1 | 12/2007 | Givon |
| 2008/0024594 | A1 | 1/2008 | Ritchey |
| 2008/0026838 | A1 | 1/2008 | Dunstan et al. |
| 2008/0239109 | A1* | 10/2008 | Jennings ............ G06K 9/32 348/241 |
| 2009/0046152 | A1* | 2/2009 | Aman ............ A63B 24/0021 348/157 |
| 2009/0059041 | A1* | 3/2009 | Kwon ............ H04N 5/217 348/241 |
| 2010/0063681 | A1* | 3/2010 | Correns ............ A01B 69/001 701/41 |
| 2010/0194862 | A1 | 8/2010 | Givon |
| 2011/0310226 | A1 | 12/2011 | McEldowney |
| 2013/0266174 | A1* | 10/2013 | Bleiweiss ............ G06K 9/4604 382/103 |

FOREIGN PATENT DOCUMENTS

| | | | | |
|---|---|---|---|---|
| EP | 1067362 | A1 | 1/2001 | |
| EP | 2378310 | * | 4/2010 | ............ G01S 17/36 |
| EP | 2378310 | A1 | 10/2011 | |
| JP | 08044490 | A1 | 2/1996 | |
| KR | 20120018915 | A | 3/2012 | |
| WO | 93/10708 | A1 | 6/1993 | |
| WO | 97/17598 | A1 | 5/1997 | |
| WO | 99/44698 | A1 | 9/1999 | |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

European Patent Office, International Search Report & Written Opinion for PCT Patent Application No. PCT/US2013/053878, Oct. 4, 2013, 11 Pages.

Labutov, et al., "Fusing Optical Flow and Stereo in a Spherical Depth Panorama Using a Single-Camera Folded Catadioptric Rig", Retrieved at <<http://ieeexplore.ieee.org/stamp/stamp.jsp?tp=&arnumber=5980103>>, IEEE International Conference on Robotics and Automation, May 9, 2011, pp. 3092-3097.

Taguchi, et al., "Axial-Cones: Modeling Spherical Catadioptric Cameras for Wide-Angle Light Field Rendering", Retrieved at <<http://www.umiacs.umd.edu/~aagrawal/sig10Asia/AxialConeSIGAsia10LowRes.pdf>>, The 3rd ACM SIGGRAPH Conference and Exhibition on Computer Graphics and Interactive Techniques in Asia, Dec. 3, 2010, pp. 8.

Gao, et al., "A Hemispherical Imaging Camera", Retrieved at <<vision.ai.uiuc.edu/publications/Gao-CVIU09.pdf>>, Computer Vision and Image Understanding Special Issue on Omni-directional Vision, Camera Networks, and Non-conventional Cameras, Feb. 2010, pp. 1-29.

Meilland, et al., "An Augmented Spherical Visual Sensor for Large Scale 3D SLAM", Retrieved at <<http://www.open-phi.org/MS/publications/ICRA2011_submission.pdf>>, Information Signal Image Vision, Jan. 21, 2011, pp. 6.

Blackburn, et al., "Incremental 3D Model Generation using Depth Cameras", Retrieved at <<http://www.ifp.illinois.edu/~kubacki1/Doc/ECE549FinalProjectReport.pdf>>, Retrieved Date: Mar. 29, 2012, pp. 1-8.

(56) References Cited

OTHER PUBLICATIONS

"PMD[vision] CamBoard nano reference design," PMD Technologies, <http://www.pmdtec.com/products-services/pmdvisionr-cameras/pmdvisionr-camboard-nano/>, Access date: Aug. 10, 2012, 3 pages.

* cited by examiner

WIDE ANGLE DEPTH DETECTION

BACKGROUND

Depth cameras may be used in a variety of different environments, and may utilize various technologies, including but not limited to time-of-flight and structured light depth sensing technologies, to determine depth from image data. Structured light depth cameras project a pre-defined light pattern onto a target and then determine depth values for an image of the target based upon distortions in an image of the light pattern. Time-of-flight depth cameras project pulses of light onto the target, and then determine depth values based upon differences in how long it takes for light reflected from different parts of the target to reach the image sensor.

SUMMARY

Embodiments are disclosed herein that relate to wide angle depth sensing cameras. For example, one disclosed embodiment provides a depth sensing camera comprising an illumination light projection subsystem and an image detection subsystem comprising an image sensor and one or more lenses and being configured to acquire image data having a field of view of 100 degrees or greater. The depth sensing camera further comprises a logic subsystem configured to execute instructions, and a data-holding subsystem comprising stored instructions executable by the logic subsystem to control the projection of illumination light and to determine depth values from image data acquired via the image sensor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In some use environments, it may be desirable to acquire depth image data having a wide field of view. As a non-limiting example, in a health care facility, it may be desirable to monitor entire rooms (e.g. patient rooms, hallways, etc.) with depth cameras to detect patient movements that may indicate a health issue. Current depth cameras may have relatively limited fields of view, for example, on the order of 50-60 degrees. Thus, monitoring such a space may involve the use of multiple cameras, which may increase a cost of a monitoring system.

Figure 1:
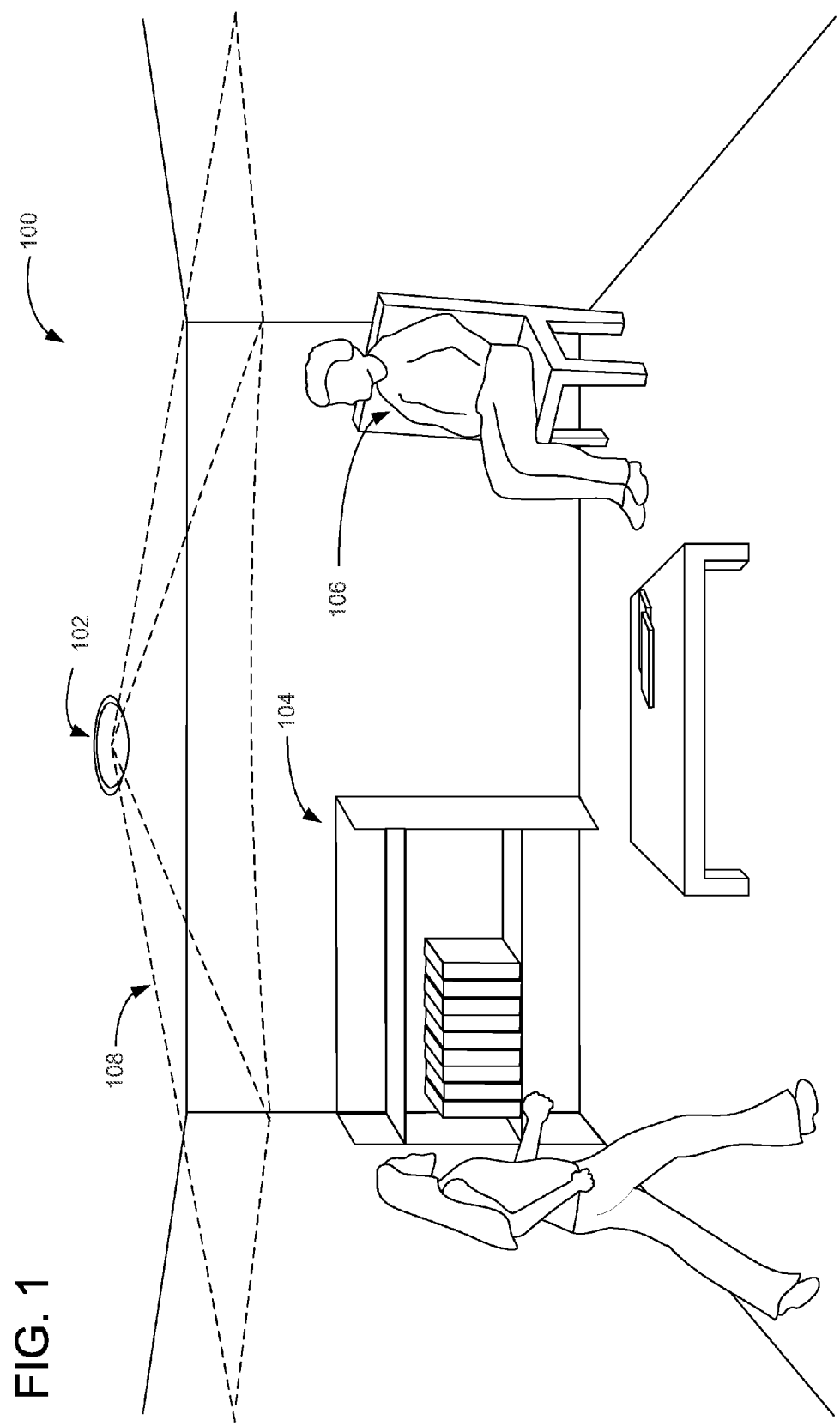
FIG. 1 schematically shows an example embodiment of a physical environment including a depth camera.

Thus, embodiments are disclosed herein relating that relate to wide angle depth cameras. FIG. 1 shows an example embodiment of a physical environment 100 including a depth camera 102 for imaging objects 104 and people 106 within the physical environment 100. The depth camera 102 is depicted as being mounted on a ceiling of the physical environment 100, but a depth camera according to the present disclosure may be mounted in any suitable location within a use environment to capture a desired view of the use environment. Dashed lines 108 represent a non-limiting example field of view of the depth camera 102. For example, a ceiling-mounted depth camera may have a field of view of 100 degrees or greater, such that a majority of a room below the depth camera may be imaged. In some embodiments, the ceiling-mounted depth camera may have a wider field of view, for example, of 170 degrees or greater (and may even exceed 180 degrees), such that an entirety of the physical space of the room may be imaged. The depth camera 102 may utilize virtually any suitable depth sensing technology to provide depth data associated with image data detected by the depth camera 102, including but not limited to time-of-flight and structured light depth sensing technologies.

Figure 2:
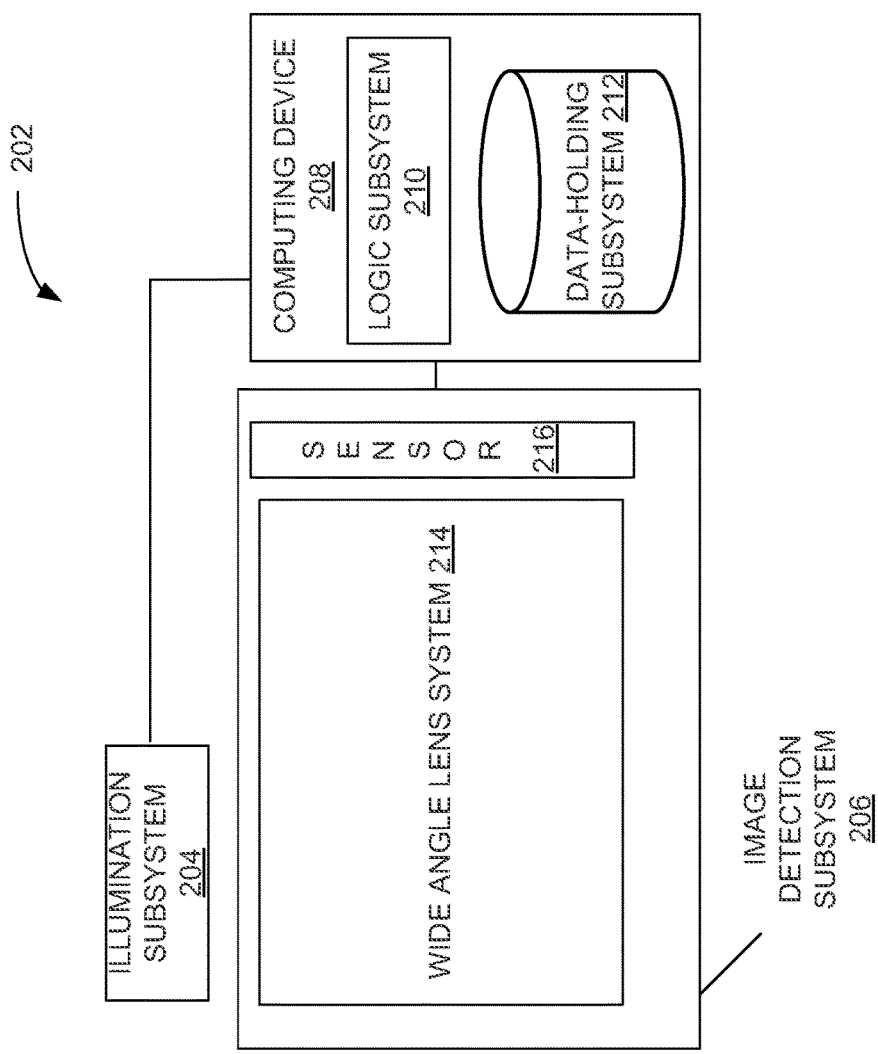
FIG. 2 is a block diagram of an embodiment of a depth camera.

FIG. 2 shows a block diagram of an embodiment of a depth camera 202 suitable for use as depth camera 102 in use environment 100. The depth camera 202 includes an illumination light projection subsystem 204, an image detection subsystem 206, and a computing device 208 having a logic subsystem 210 and a data-holding subsystem 212, described in more detail below. The illumination light projection subsystem 204 is configured to project suitable illumination light into the use environment 100 for acquiring depth images. For example, the illumination light projection subsystem 204 may comprise a projector configured to project light pulses for a time-of-flight depth determination, a structured light pattern projector for a structured light depth determination, and/or any other suitable light source.

The image detection subsystem 206 may be configured to acquire image data having a wide field of view, for example, of 100 degrees or greater, and includes a wide angle lens system 214 and an image sensor 216. The wide angle lens system 214 may include any suitable lenses arranged in any suitable configuration, including but not limited to a fish-eye lens configuration, lens configurations including aspheric mirrors and/or lenses, lenslet arrays, etc.

The logic subsystem 210 and the data-holding subsystem 212 are in communication with the illumination light projection subsystem 204 and the image sensor 216. Further, the data-holding subsystem 212 may comprise instructions stored thereon that are executable by the logic subsystem 210, for example, to control the illumination light projection subsystem 204, receive and interpret image data from the image sensor 216, correct distortion of the received image data to generate corrected image data, and determine depth image data from the corrected image data, among other potential tasks.

In some embodiments, the instructions may be executable to control to the illumination light projection subsystem 204 to dynamically vary a field of illumination of the projected light. This may help to reduce power consumption, conserve computational resources, and/or reduce interference with other light-based communications systems operating in the same use environment, such as other devices that utilize infrared light emitters and/or sensors. In some such embodiments, illumination may be directed to a particular region or regions of interest having a narrower field of illumination than the field of view of the imaging system. Such a region or regions of interest may be defined in any suitable manner, and may change dynamically. For example, a region of interest may be defined as an area surrounding a fixed object, such as a doorway or chair, and/or as an area surrounding a moving object, such as a person, etc.

Further, in some embodiments, a region of interest may represent a region that could be disrupted by the illumination and/or projection, such as a region near an optical communications system, in order to prevent interference. In such embodiments, the illumination and/or projection may be dynamically altered when directed toward the region to eliminate or decrease the amount of light emitted and/or projected relative to light emitted and/or projected in other regions of interest that do not experience interference from the illumination and/or projection.

Images acquired via a wide angle lens may be distorted such that imaged objects appear elongated when sensed along a periphery of the field of view. As such, the instructions may be executable to correct for such distortion in image data. Any suitable methods may be used to correct for distortion. For example, in some embodiments, upsampling and/or downsampling of image data may be performed to decrease an image resolution in regions adjacent to a periphery of an image compared to regions closer to a center of the image. Further, in some embodiments, a coordinate transformation may be performed to transform the image data from radial to Cartesian coordinates. As explained in more detail below, image distortion may also be mitigated by the use of an image sensor with non-uniform pixel sizes, and/or the use of a pre-distorted structured light pattern in a structured light depth camera.

Figures 3, 4:
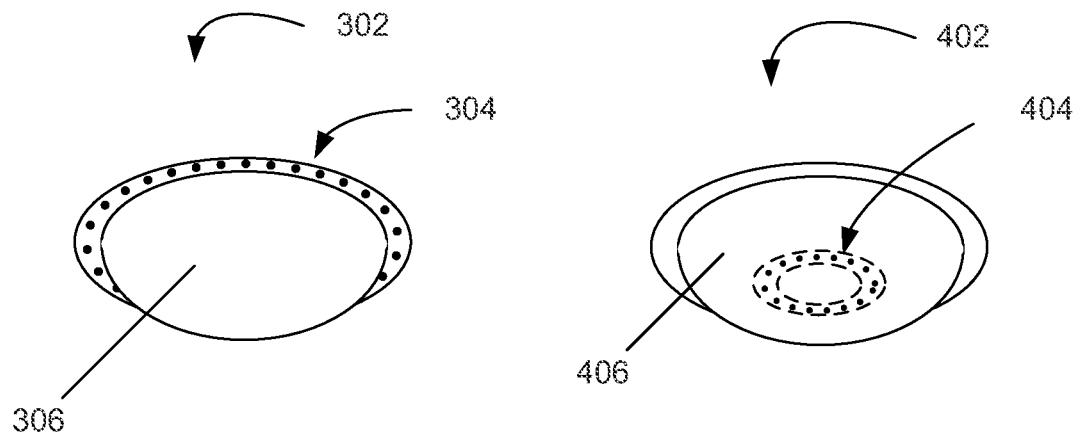
FIG. 3 shows an example embodiment of an illumination projection subsystem for a time-of-flight depth camera.
FIG. 4 shows another example embodiment of an illumination projection subsystem for a time-of-flight depth camera.

A wide angle depth camera according to the present disclosure may utilize any suitable light source arrangement to output illumination light. For example, FIG. 3 shows an example embodiment of a dome-shaped time-of-flight depth camera 302. The time-of-flight depth camera 302 includes an illumination light projection subsystem comprising a plurality of coherent infrared light sources 304 arranged around a periphery of a lens 306. The light sources may be arranged in any suitable pattern and may be configured to emit light in any suitable direction to fill a desired depth imaging environment with illumination light. Each coherent infrared light source 304 may be controlled by a computing device to emit infrared light pulses at predetermined intervals, as described above. The depth camera may thereby determine depth values based on a round-trip time-of-flight of light emitted by the one or more coherent infrared light sources 304 and reflected back to the image sensor.

FIG. 4 shows another example of a light source arrangement for a wide angle time-of-flight depth camera 402, in which a plurality of light sources 404 are arranged behind a lens 406 with respect to the depth imaging environment such that each infrared light source 404 projects infrared light through the lens 406. The infrared light sources 404 may be arranged in any suitable configuration to achieve a desired illumination profile within the depth imaging environment.

Further, in some embodiments, coherent infrared light sources may be arranged both inside and outside of a lens system relative to an image sensor. It will be understood that the embodiments of FIGS. 3 and 4 are presented for the purpose of example, and are not intended to be limiting in any manner, as any suitable arrangement of light sources may be used to illuminate a depth imaging environment.

In the instance of a wide angle structured light depth camera, an illumination light projection subsystem may include one or more projectors each configured to project a structured light pattern into the depth imaging environment. Any suitable number and arrangement of projectors and lenses may be used to project a structured light pattern with a sufficiently wide angle.

As mentioned above, due to potential image distortion in peripheral regions of images captured by a wide angle lens system, a structured light pattern may be pre-distorted such that the pattern elements have a lower resolution (e.g. wider spacing) in peripheral regions of the pattern as viewed by the wide angle lens system compared to central regions of the pattern. This may help to compensate for similar distortions in images acquired of the structured light pattern as reflected from objects in the depth imaging environment. To form such a pattern, in some embodiments, an initially undistorted structured light image may be projected through a similar or same wide angle lens system as that used to acquire images of the depth imaging environment. In other embodiments, a desired distorted structured light pattern may be determined based upon the distortion of the imaging system, and one or more projectors may be configured to project the desired distorted pattern. In yet other embodiments, any other suitable optical arrangements may be employed.

Figure 5A:
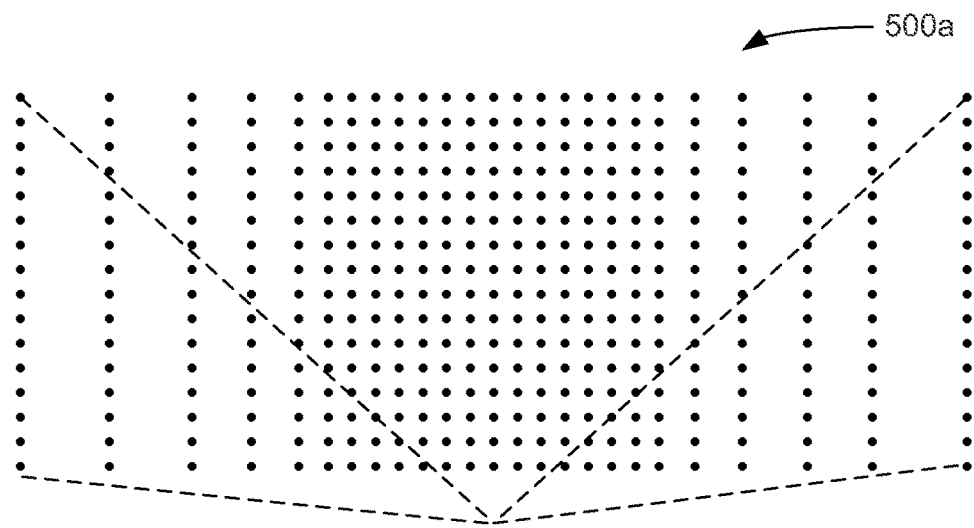
FIGS. 5A-5B show example embodiments of structured light patterns projected by a structured light depth camera.
Figure 5B:
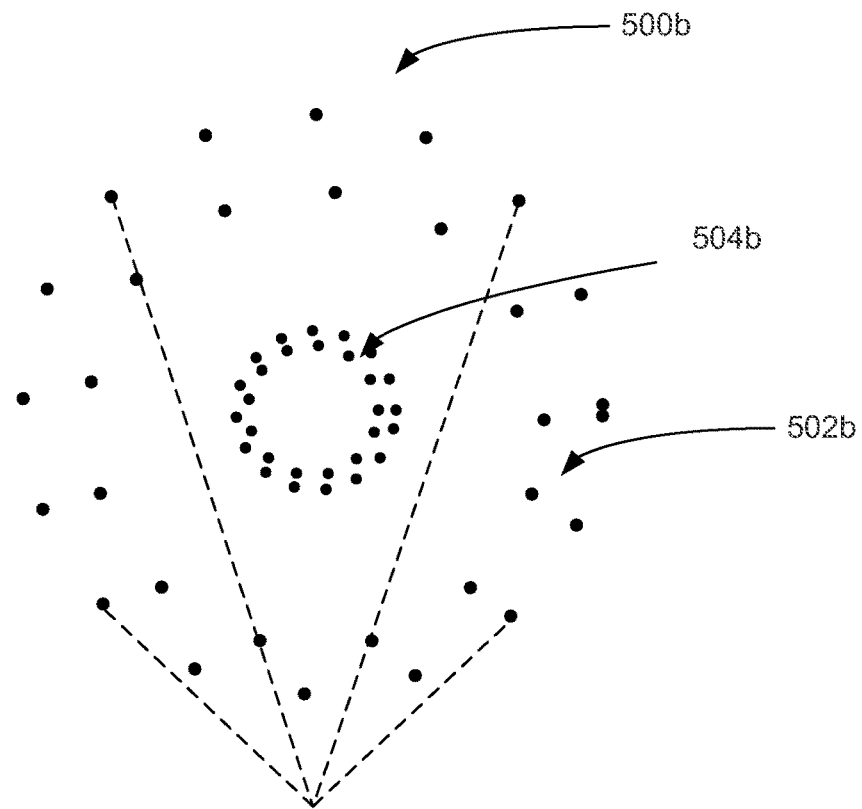

FIGS. 5A and 5B show schematic representations of example structured light patterns having wider feature spacing at a periphery than at a center of the pattern. FIG. 5A illustrates this concept along a single dimension as a rectangular structured light pattern 500a with feature spacings that widen as a periphery of the pattern is approached in a horizontal direction. FIG. 5B shows an example circular structured light pattern 500b with feature spacings that widen as a periphery of the pattern is approached in a radial direction, and illustrates an example of how such a light pattern may be implemented for a wide angle depth camera that images a spherical or similar field of view. In FIG. 5B, four generally concentric rings of structured light features, rather than a full pattern, are illustrated for clarity. Two inner rings 502b are shown as having a first, closer spacing, and two outer rings 504b are shown as having a second, wider spacing. It will understand that other structured light pattern features may be located between the depicted pairs of rings, and that the spacings between such features may be configured to vary according to the lens distortion being corrected. As such, it will be understood that a type and amount of distortion in a structured light pattern may be based on the particular optics used to collect imaging light for the image sensor, and that the distortion may or may not be uniform in different directions from a center of the structured light pattern.

Further, in some embodiments, the structured light pattern may have a density of structured light features that is dynamically controllable. For example, when directed at a first region of interest, the structured light pattern may be controlled to have feature spacings that reduce in size as a periphery of the pattern is approached, and when directed at a second region of interest, may be controlled to have features spacings that remain constant or even increase in size as the periphery of the pattern is approached.

Figure 6A:
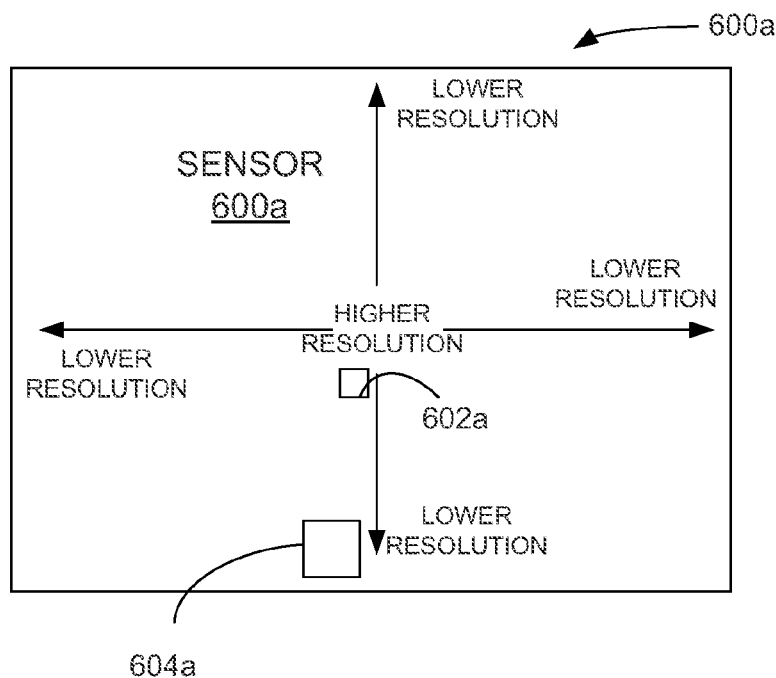
FIGS. 6A-6B show example embodiments of image sensors within a depth camera.
Figure 6B:
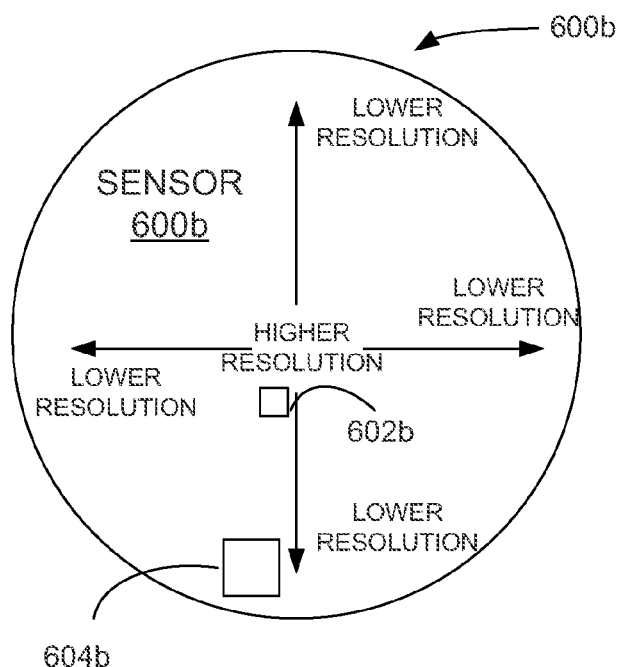

As mentioned above, an image sensor used with a wide angle depth camera may utilize a non-uniform arrangement of sensor pixels to help compensate for distortion caused by a wide angle lens system. Such an image sensor may have any suitable arrangement of pixels. For example, such an image sensor may have a lower resolution (e.g. fewer pixels per unit length) close to a periphery of the image sensor than at a center of the image sensor. FIG. 6A schematically shows an example embodiment of a rectangular image sensor 600a with a non-uniform pixel spacing, and FIG. 6B shows a circular image sensor 600b with such a pixel spacing. Each image sensor includes a plurality of pixels which are non-uniformly-sized such that pixels 602a, 602b nearer to the center are higher resolution than pixels 604a, 604b closer to a periphery of the image sensors.

Figure 7:
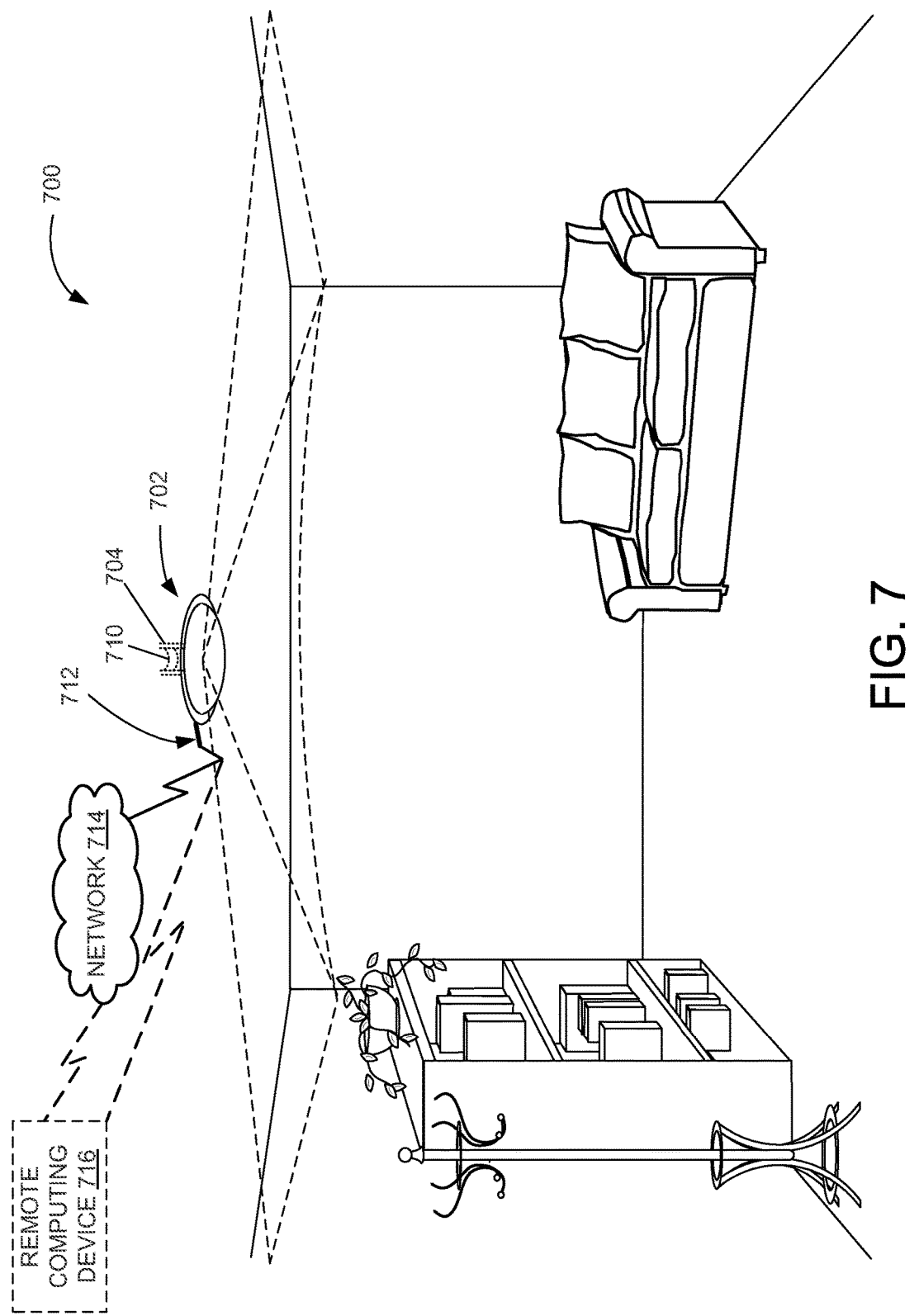
FIG. 7 schematically shows an example embodiment of a physical environment including a depth camera mounted in a light socket.

As discussed above, a wide angle depth camera may be configured to be mounted on a ceiling in order to detect all or most of a room-based environment. In some embodiments, such mounting may be facilitated by configuring the depth camera to be mounted into a standard light socket, such as an incandescent socket, a commercial fluorescent light socket, and/or any suitable light socket. FIG. 7 shows an example embodiment of a physical environment 700 including a depth camera 702 mounted in an overhead incandescent light socket 704. The depth camera 702 may include a threaded metal base 710 to interface with the matching light socket 704. The depth camera 702 may also include a power system configured to perform a conversion from the AC power provided by the light socket 704 to DC power utilized by the depth camera 702. Further, in some embodiments, the depth camera 702 may include one or more batteries to provide main or backup power. While shown as being mounted in a ceiling socket, it will be understood that the depth camera 702 may be mounted in any other suitable location.

The depth camera 702 further may include a communication subsystem 712 configured to communicate wirelessly over a network 714 with one or more remote computing devices 716. For example, the communication subsystem 712 may include a wireless transceiver capable of transmitting and receiving information on the network 714 utilizing WiFi, WiMAX, and/or any suitable wireless protocol. In additional or alternative embodiments, the communication subsystem 712 may be configured to communicate via power line communication through the light socket 704 or via a direct connection with the remote computing device 716 (e.g., WiFi direct, Bluetooth, etc.). The communication subsystem 712 enables the depth camera 702 to send image data to the remote computing device 716 and/or to be controlled by the remote computing device 716.

Figure 8:
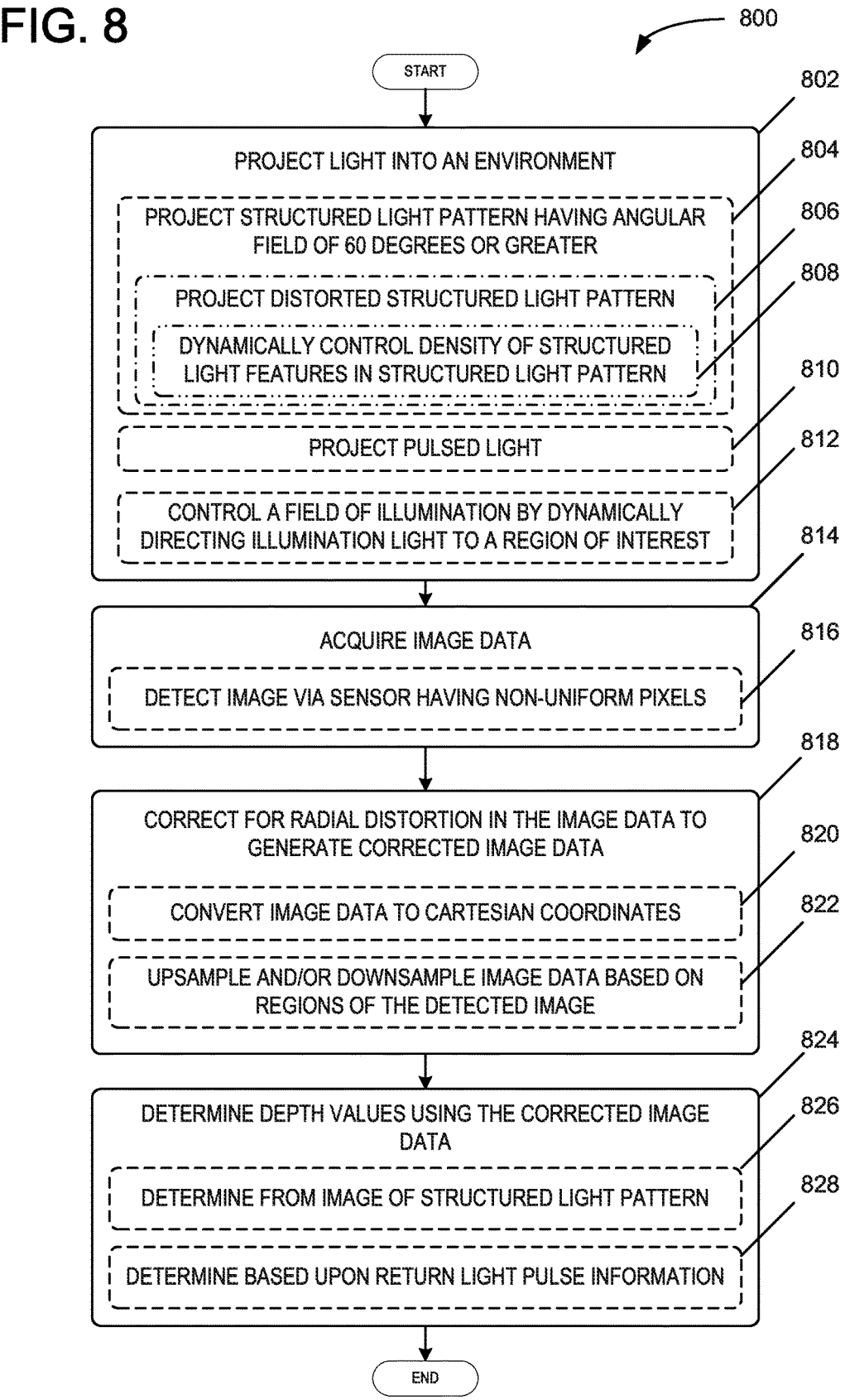
FIG. 8 is a flow diagram of an embodiment of a method of acquiring depth image data with a structured light depth camera.

FIG. 8 shows a flow diagram illustrating an embodiment of a method 800 for acquiring depth image data via a wide angle depth camera. At 802, an illumination light projection subsystem of the depth camera projects light into an environment that is to be imaged. In one non-limiting example utilizing a structured light depth camera, a structured light pattern may be projected with an angular field of view of 100 degrees or greater at 804 (and potentially 170-180 degrees or greater). Such a projector may project a distorted structured light pattern having a plurality of non-uniformly-spaced pattern elements, as indicated at 806, to pre-compensate for distortion by a wide angle lens of the structured light depth camera. Further, in some embodiments, a density of structured light features in the structured light pattern may be dynamically controlled, as described above and as indicated at 808. As another non-limiting example, light pulses may be projected using a plurality of light sources, as indicated at 810, for use in a time-of-flight depth camera. As yet another example, a field of illumination may be controlled by dynamically directing illumination light to a region of interest, as indicated at 812.

Next, as indicated at 814, the depth camera acquires image data. The image data may have any suitable field of view, including but not limited to a field of view of 100 degrees or greater. In some embodiments, the image may be detected via a sensor having non-uniform pixels and used to generate the image data at 816. Next, at 818, the depth camera corrects for radial distortion in the image data to generate corrected image data. Such correction may include, for example converting the image data from polar coordinates to Cartesian coordinates, as indicated at 820. Distortion correction also may include upsampling and/or downsampling image data based on regions of the detected image, as indicated at 818.

At 824, method 800 comprises determining depth values for the image data based upon the corrected image data. For example, as shown at 826, a structured light depth camera may determine depth values by comparing the image data to the structured light pattern. As another example, as shown at 828, a time-of-flight camera may determine depth values based on return infrared light pulse information.

In other embodiments, a wide field of view may be imaged via a mechanically scanning image sensor, rather than or in addition to an imaging system that utilizes a wide angle lens system. In such embodiments, either a one-dimensional image sensor (e.g. one line of pixels) or a two-dimensional image sensor may be used. Use of a one-dimensional image sensor may help reduce an amount of time used to read the sensor, and thereby may allow faster scan speeds.

Figure 9:
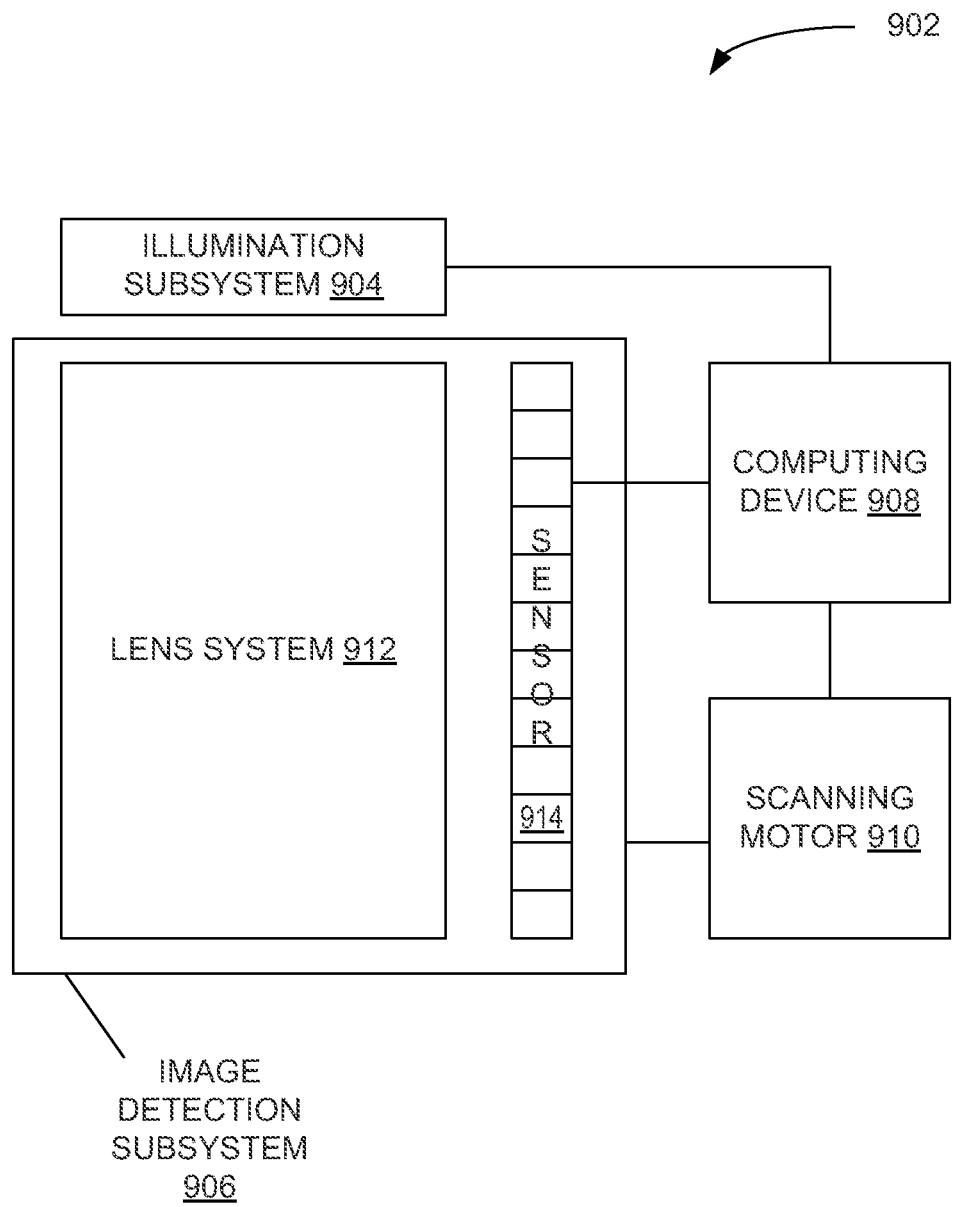
FIG. 9 is a block diagram of an embodiment of a scanning line depth camera.

FIG. 9 shows a block diagram of an example embodiment of a mechanically scanning depth camera 902. The mechanically scanning depth camera 902 includes an illumination light projection subsystem 904, an image detection subsystem 906, a computing device 908, and a scanning motor 910. The image detection subsystem 906 may be configured to acquire image data having a field of view of 100 degrees or greater by scanning one or more of a lens system 912 and an image sensor 914. The image sensor may comprise a line camera comprising a one-dimensional array of pixels (as schematically shown in FIG. 9), or a two-dimensional array of pixels.

The mechanically scanning depth camera 902 may be configured to image a room by scanning in any suitable manner For example, the mechanically scanning depth camera 902 may scan the image sensor and lens system together in a circular pattern, capturing multiple line images during the scanning to generate two dimensional image data for depth analysis. Further, other optics (e.g. lenses, mirrors, etc.) may be used to allow the mechanically scanned components to be physically scanned less than a full circle. Further, in some embodiments, an illumination light subsystem may be configured to scan with components of the image detection subsystem 906, or may be stationary.

In some embodiments, the above described methods and processes may be tied to a computing system including one or more computers. In particular, the methods and processes described herein may be implemented as a computer application, computer service, computer API, computer library, and/or other computer program product.

Figure 10:
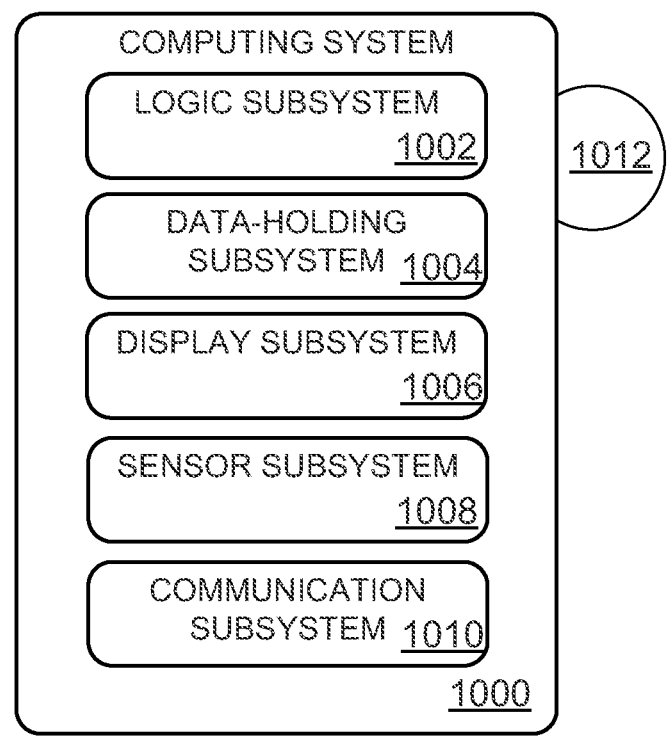
FIG. 10 is a block diagram of an example embodiment of a computing system.

FIG. 10 schematically shows a non-limiting computing system 1000 that may perform one or more of the above-described methods and processes. The computing system 1000 is shown in simplified form. It is to be understood that virtually any computer architecture may be used without departing from the scope of this disclosure. In different embodiments, computing system 1000 may take the form of a mainframe computer, server computer, desktop computer, laptop computer, tablet computer, depth camera, home entertainment computer, network computing device, mobile computing device, mobile communication device, gaming device, etc.

Computing system 1000 includes a logic subsystem 1002 and a data-holding subsystem 1004. Computing system 1000 may optionally include a display subsystem 1006, sensor subsystem 1008, communication subsystem 1010, and/or other components not shown in FIG. 10. Computing system 1000 may also optionally include user input devices such as keyboards, mice, game controllers, cameras, microphones, and/or touch screens, for example.

Logic subsystem 1002 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1002 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 1004 may include one or more physical, non-transitory, devices configured to hold data and/or instructions executable by the logic subsystem to implement the herein described methods and processes. When such methods and processes are implemented, the state of data-holding subsystem 1004 may be transformed (e.g., to hold different data).

Data-holding subsystem 1004 may include removable media and/or built-in devices. Data-holding subsystem 1004 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 1004 may include devices with one or more of the following characteristics: volatile, nonvolatile, dynamic, static, read/write, read-only, random access, sequential access, location addressable, file addressable, and content addressable. In some embodiments, logic subsystem 1002 and data-holding subsystem 1004 may be integrated into one or more common devices, such as an application specific integrated circuit or a system on a chip.

FIG. 10 also shows an aspect of the data-holding subsystem in the form of removable computer-readable storage media 1012, which may be used to store and/or transfer data and/or instructions executable to implement the herein described methods and processes. Removable computer-readable storage media 1012 may take the form of CDs, DVDs, HD-DVDs, Blu-Ray Discs, EEPROMs, and/or floppy disks, among others.

It is to be appreciated that data-holding subsystem 1004 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The term "program" may be used to describe an aspect of the computing system 1000 that is implemented to perform one or more particular functions. In some cases, such a program may be instantiated via the logic subsystem 1002 executing instructions held by the data-holding subsystem 1004. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 1006 may be used to present a visual representation of data held by data-holding subsystem 1004. As the herein described methods and processes change the data held by the data-holding subsystem, and thus transform the state of the data-holding subsystem, the state of display subsystem 1006 may likewise be transformed to visually represent changes in the underlying data. Display subsystem 1006 may include one or more display devices utilizing virtually any type of technology. Such display devices may be combined with logic subsystem 1002 and/or data-holding subsystem 1004 in a shared enclosure, or such display devices may be peripheral display devices.

When included, sensor subsystem 1008 may be used to provide observation information to the logic subsystem 1002 and/or the data-holding subsystem 1004, for example. As described above, observation information such as image data, depth image data, and/or any other suitable sensor data may be used to perform such tasks as determining a particular gesture performed by a person within a room, performing object recognition, etc.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow computing system 1000 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A depth sensing camera, comprising:
an illumination light projection subsystem;
an image detection subsystem configured to acquire image data including one or more images, each of the one or more images having a field of view of 100 degrees or greater, the image detection subsystem comprising an image sensor and one or more lenses, wherein the image sensor comprises a plurality of non-uniformly-sized pixels;
a logic subsystem configured to execute instructions; and
a data-holding subsystem comprising stored instructions executable by the logic subsystem to control projection of illumination light and to determine depth values from image data acquired via the image sensor.

2. The depth sensing camera of claim 1, wherein the illumination light projection subsystem comprises one or more coherent infrared light sources, and wherein the instructions are executable to determine depth values based on a round-trip time-of-flight of light emitted by the one or more coherent infrared light sources and reflected back to the image sensor.

3. The depth sensing camera of claim 2, wherein the instructions are further executable to correct for radial distortion.

4. The depth sensing camera of claim 2, wherein the instructions are executable to correct for radial distortion by performing one or more of upsampling and downsampling regions of an image detected by the image detection subsystem and converting image data to Cartesian coordinates.

5. The depth sensing camera of claim 1, wherein the illumination light projection subsystem comprises a projector configured to project a structured light pattern, and wherein the instructions are executable to determine depth values based on an image of the structured light pattern as reflected from one or more objects.

6. The depth sensing camera of claim 5, wherein the projector is configured to project a structured light pattern with more widely spaced pattern elements at a periphery of the structured light pattern than at a center of the structured light pattern.

7. The depth sensing camera of claim 5, wherein the instructions are executable to control a density of structured light features in the structured light pattern.

8. The depth sensing camera of claim 5, wherein the instructions are further executable to correct for radial distortion and convert image data to Cartesian coordinates.

9. The depth sensing camera of claim 1, wherein the image detecting subsystem comprises a mechanically scanning camera and the image sensor comprises a one-dimensional array of pixels.

10. The depth sensing camera of claim 1, wherein the illumination light projection subsystem is configured to control a field of illumination by dynamically directing illumination light to a region of interest.

11. The depth sensing camera of claim 1, wherein the plurality of non-uniformly-sized pixels provides lower resolution towards the periphery of the sensor surface as compared to the resolution at the center of the sensor surface.

12. The depth sensing camera of claim 1, wherein the depth sensing camera is configured to be mounted in a light socket.

13. The depth sensing camera of claim 12, further comprising a communication subsystem configured to communicate via a wireless network.

14. A time-of-flight depth camera, comprising:
an illumination light projection subsystem comprising one or more infrared light sources;
an image detection subsystem configured to acquire image data having a field of view of 170 degrees or greater, the image detection subsystem comprising an image sensor comprising a plurality of non-uniformly-sized pixels, and one or more lenses;
a logic subsystem configured to execute instructions; and
a data-holding subsystem comprising stored instructions executable by the logic sub system to:
control projection of the one or more infrared light sources;
acquire image data via the image detection subsystem;
correct for radial distortion in the image data to generate corrected image data; and
determine depth values from the corrected image data.

15. The time-of-flight depth camera of claim 14, wherein the instructions are further executable to correct for radial distortion by converting the image data to Cartesian coordinates.

16. The time-of-flight depth camera of claim 14, wherein the instructions are executable to correct for radial distortion by performing one or more of upsampling and downsampling regions of an image detected by the image detection subsystem.

17. The time-of-flight depth camera of claim 14, wherein the plurality of non-uniformly-sized pixels provides lower resolution towards the periphery of the sensor surface as compared to the resolution at the center of the sensor surface.

18. In a structured light depth camera including a projector, an image sensor comprising a plurality of non-uniformly-sized pixels, and one or more lenses, a method of acquiring image data comprising:
projecting a pre-distorted structured light pattern including a plurality of non-uniformly-spaced pattern elements having a lower resolution at a periphery of the structured light pattern than at a center of the structured light pattern;
acquiring image data via the plurality of non-uniformly-sized pixels of the image sensor, the image data capturing the structured light pattern as reflected from a depth imaging environment;
correcting for radial distortion in the image data to generate corrected image data; and
determining depth values from the corrected image data.

19. The method of claim 18, wherein the structured light pattern has a projected field of view of 100 degrees or greater, and wherein the plurality of non-uniformly-spaced pattern elements have a wider spacing at the periphery of the structured light pattern than at the center of the structured light pattern.

20. The method of claim 18, wherein correcting for radial distortion includes converting image data to Cartesian coordinates.

\* \* \* \* \*